United States Patent [19]

Sivilotti et al.

[11] 3,766,386
[45] Oct. 16, 1973

[54] PROFILE MEASUREMENT OF MOVING METAL STRIP

[75] Inventors: Olivo G. Sivilotti; William Elfyn Davies, both of Kingston, Ontario, Canada

[73] Assignee: Alcan Research and Development Limited, Montreal, Quebec, Canada

[22] Filed: Nov. 3, 1971

[21] Appl. No.: 195,339

[52] U.S. Cl. ............................................. 250/83.3 D
[51] Int. Cl. ............................................. G01n 23/02
[58] Field of Search ............................... 250/83.3 D

[56] References Cited
UNITED STATES PATENTS

| | | | |
|---|---|---|---|
| 3,179,800 | 4/1965 | McNamara | 250/83.3 D X |
| 3,474,668 | 10/1969 | Mangan | 250/83.3 D X |
| 3,531,827 | 10/1970 | Dragonette | 250/83.3 D X |

*Primary Examiner*—Archie R. Borchelt
*Attorney*—Robert S. Dunham et al.

[57] ABSTRACT

For measuring the transverse thickness profile of metal strip advancing longitudinally, e.g., from a rolling mill, the strip is scanned along a line across its path by thickness measuring means using an X-ray beam at an acute angle to the strip plane, while the thickness is simultaneously measured at a selected point of the line by means having an X-ray beam at a like but opposite angle, the two measuring means being carried by C-shaped structures with mutually staggered arms accommodating the beams at crossing angles whereby the scanning means can pass the other means without mutual interference of function. By combining the signals from the two measurements, longitudinal thickness variations during scanning time are in effect eliminated and an accurate, rapid determination of transverse profile is obtained. The operation is especially useful in relation in hot rolling of strip, permitting adjustments during rolling, automatically if desired, to correct or avoid profile errors, with particular advantage in avoidance of such distortions of shape as may occur, upon rewinding an ultimate cold rolled strip, because of non-flatness of profile that cannot be corrected in cold rolling.

34 Claims, 9 Drawing Figures

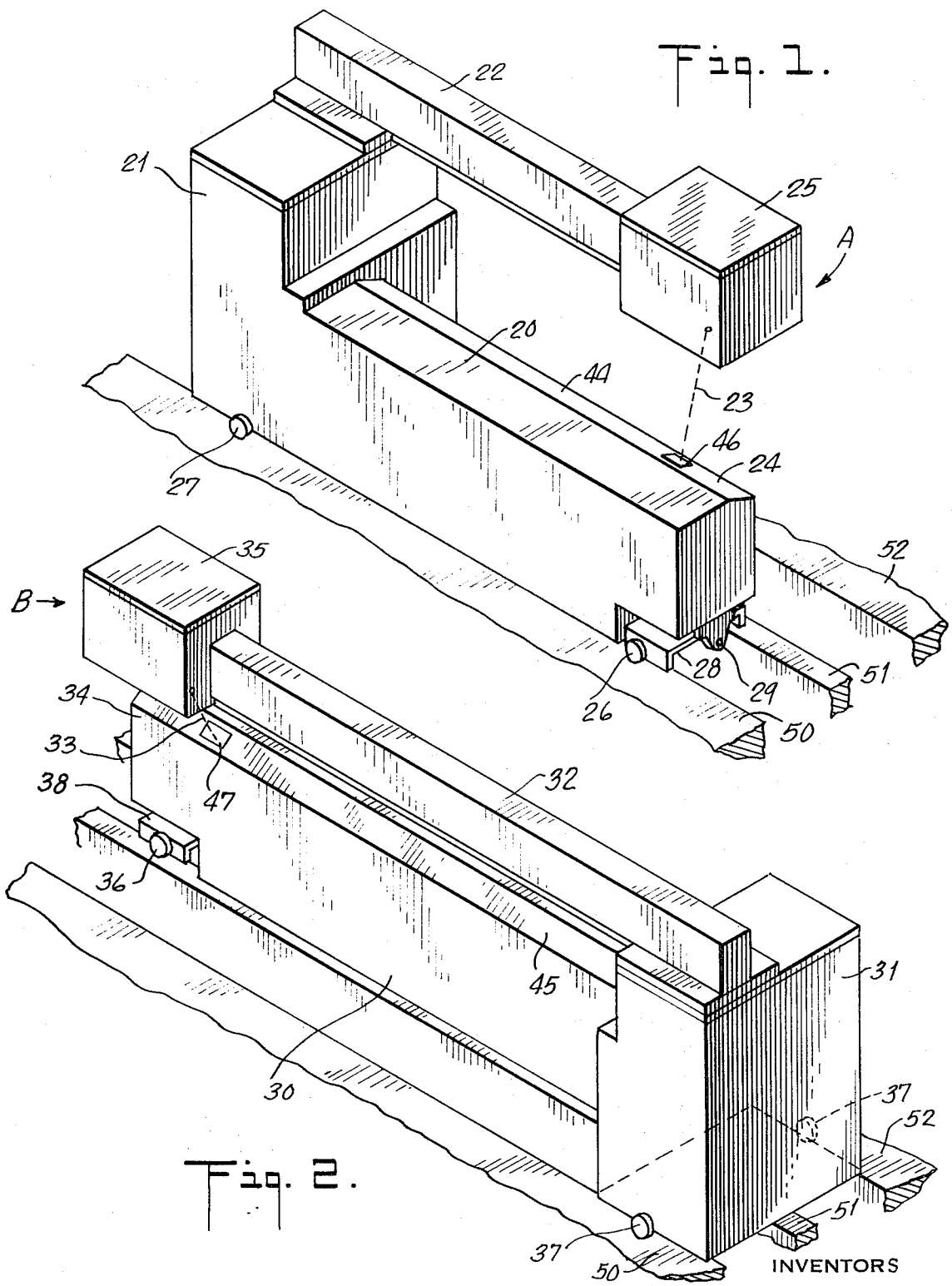

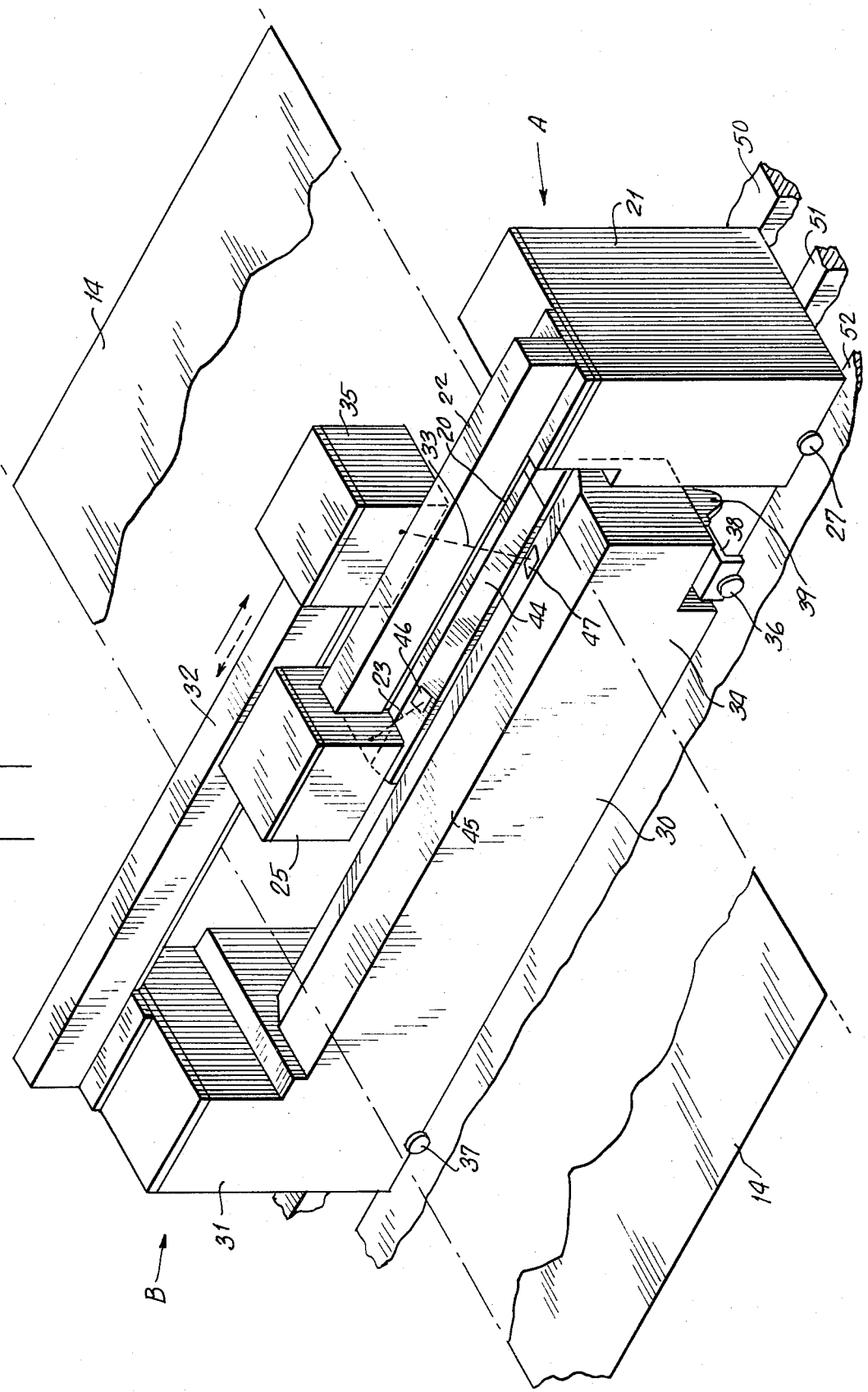

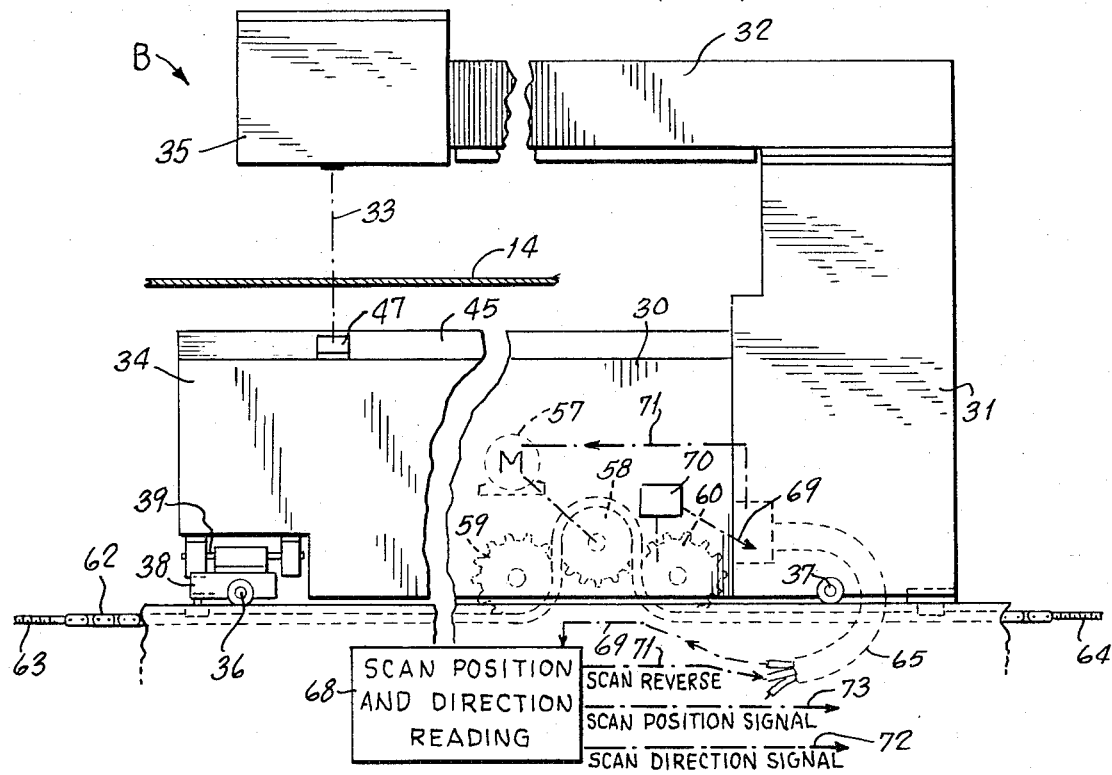
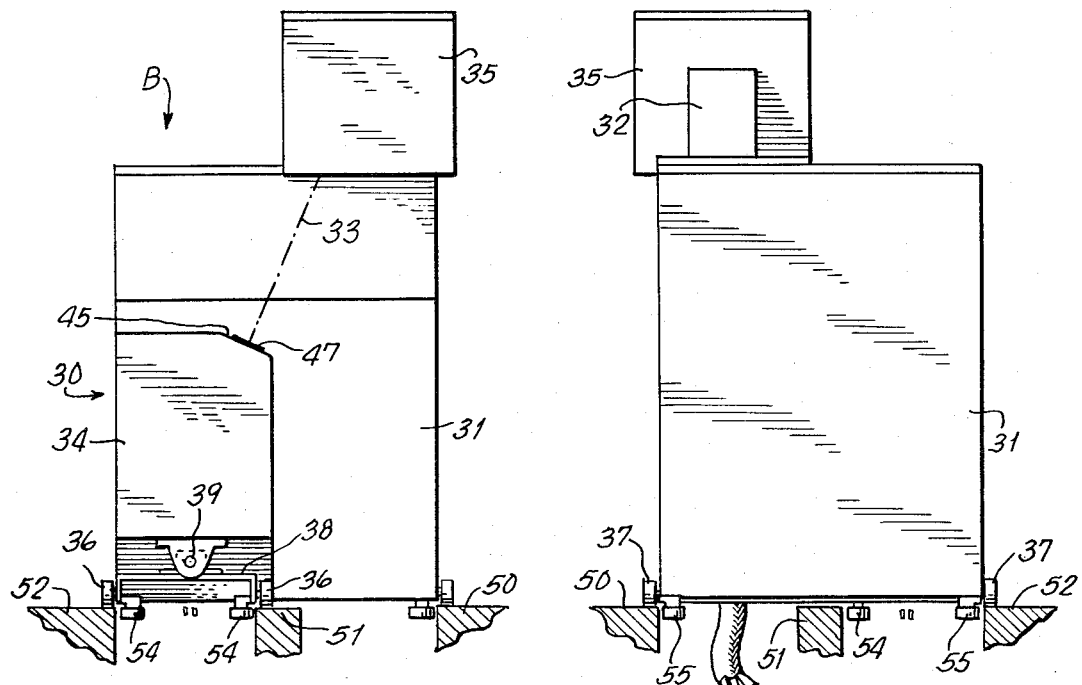

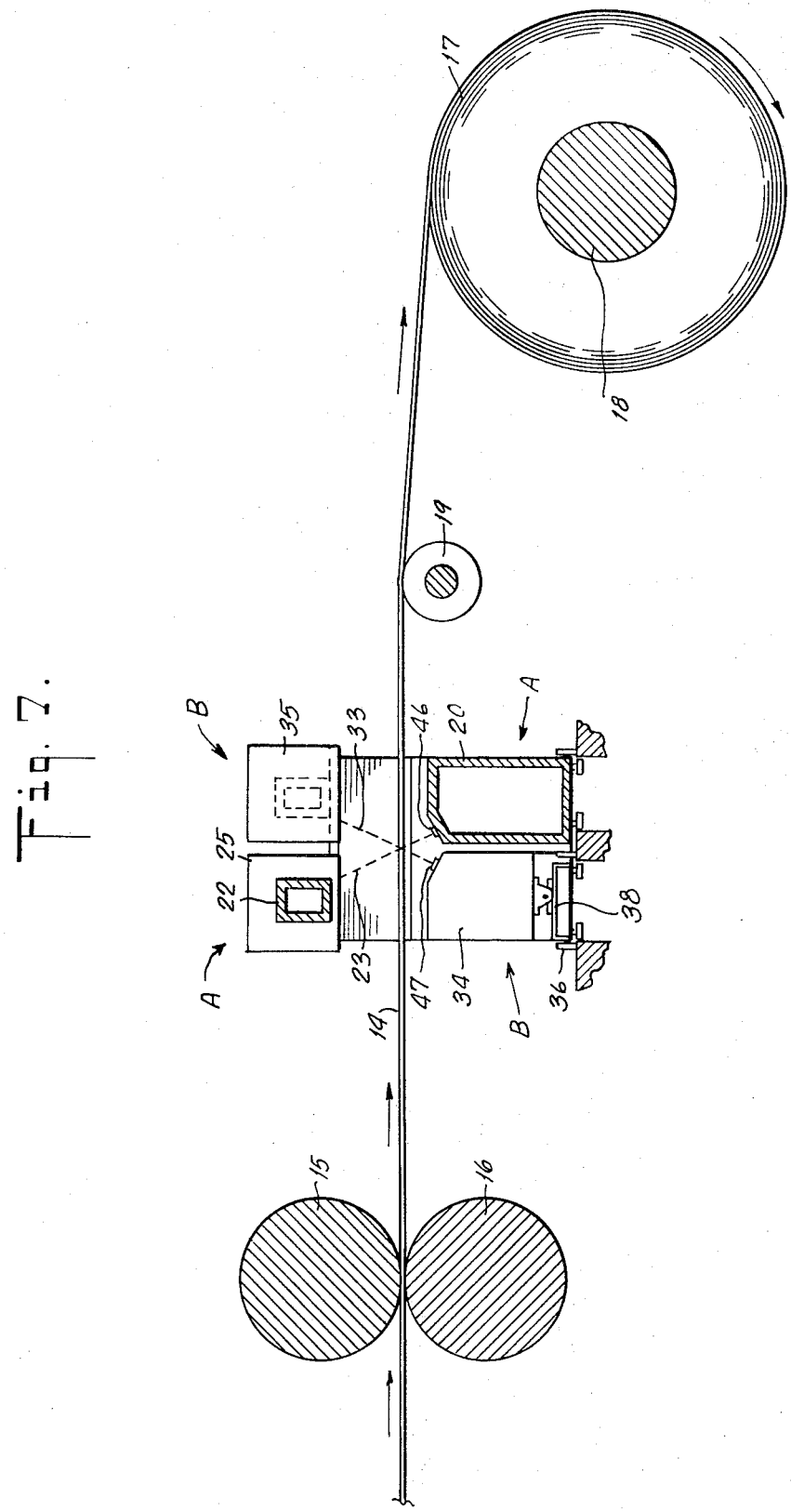

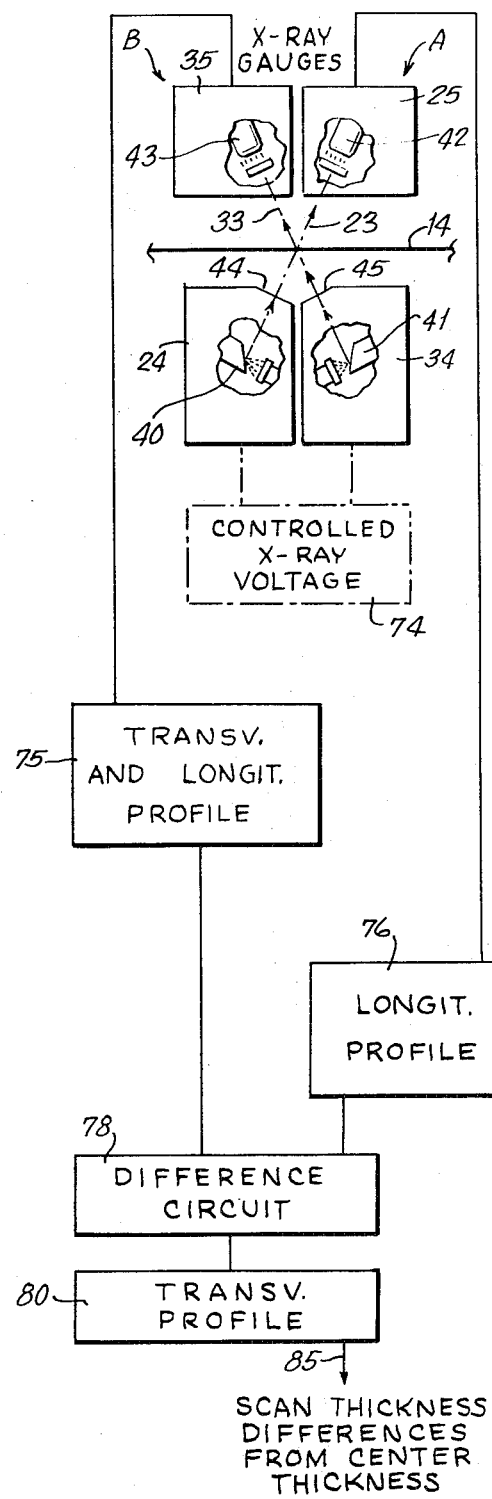
Fig. 8.
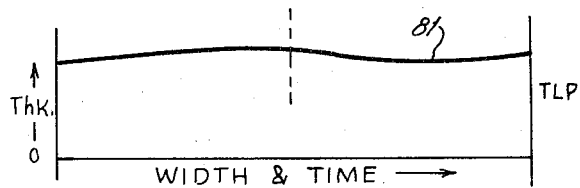
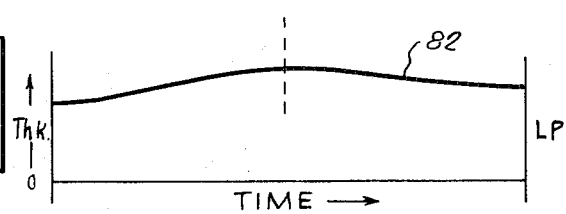
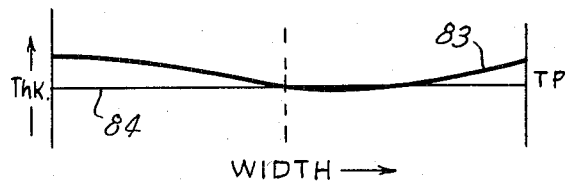

PROFILE MEASUREMENT OF MOVING METAL STRIP

BACKGROUND OF THE INVENTION

This invention relates to procedure and apparatus for measuring the thickness profile across a moving strip, expecially a rapidly moving strip of sheet metal as delivered, for example from the work rolls of a rolling mill, to be rewound on a conventional take-up reel or mandrel under appropriate tension.

Investigations leading or related to the present invention have revealed that a high degree of thickness uniformity crosswise of a rolled strip, for example of aluminum (including aluminum alloys), and indeed of other metal as well, is extremely desirable, not only to achieve high dimensional precision for such products but also to satisfy handling and marketing requirements in respect to proper rewinding and especially for avoidance of off-flatness or other serious defect, e.g., as may result from excessive local areas of stress in the interlap stress distribution in rewound coils.

Thus if the cross-section of the strip is non-uniform, e.g., in that there are appreciable differences in thickness across the strip between its lateral edges, unequal stresses may be imposed at various localities in successive laps of the coil as or after the strip is wound under tension, with localized concentrations that can in at least many cases exceed the yield strength of the metal. For example, at a number of localities along a longitudinal band of excessive thickness there may be actual deformation of the metal, exhibited as local waves or the like which are seen when the strip is removed from the coil and which represent, in effect, localized extensions of the sheet relative to other parts of it. Studies have now shown, as indicated above, that such problems of severe off-flatness or other defects in the finished product may arise from cross-sectional, i.e., profile errors, and of course, the latter may in themselves represent an undesired departure from dimensional requirements where close tolerances are needed.

Although it appears that for a given metal, such as aluminum and its alloys, products of softer metal are most affected by non-uniform profile because the tolerance for stress concentration is dependent on the maximum stress that the metal can support without yielding plastically, problems of the above sort may exist to some degree in most rolled products, i.e., strip that is to be rewound in a coil. In general, for example, it appears that a safe condition, e.g., safety against shape or other impairment in many cases, is only obtained when the strip profile is maintained within a tolerance about the selected normal or target value, equal to or less than the maximum elastic strain that the metal being rewound can support without yielding plastically. For common aluminum alloys, for example, this tolerance can be equal to 0.2 percent of the gauge being rewound. For steel strip being rewound after hot rolling this tolerance could be even tighter depending on the alloy and the recoiling temperature.

Accordingly, it has been found that it would be very desirable to obtain a measurement of the strip thickness profile during actual processing of the strip, e.g., as the strip is being delivered from the rolls of a mill, whether single or tandem, which may be effectively adjusted or controlled to maintain desired profile characteristics. Under such circumstances, the operator can keep the mill (which may be an early one in a sequence of hot and cold rolling) adjusted to provide desired flatness characteristics, especially as to uniform thickness and can in fact do so while the mill is processing the strip. Thus for example, if at the very outset of a rolling pass the profile can be brought to proper condition and if frequent measurements are then rapidly available, corrective adjustments of the mill, as to roll bending forces, coolant distribution or the like, can be brought about before any detected departures from desired profile reach an unsafe or unwanted value.

So far as could be ascertained during investigation leading to the present invention, available profile gauges that are supposedly capable of measuring the thickness profile of a moving strip do not provide suitably rapid or accurate results for satisfactory control of strip properties during rolling. One such device has embodied a traversing thickness gauge of the X-ray type, which scans the thickness of the strip across its width, by moving perpendicularly to the path of strip travel. It is known, however, that the overall thickness of the strip varies during a rolling pass, essentially apart from the profile characteristics or changes in them. In the meter just described, effort to account for these longitudinal thickness variations has been directed to averaging such variations over long lengths of the strip. This means that the speed of response is relatively slow, in that a significant profile reading is only obtainable after a relatively long time, and may involve many hundreds of feet or thousands of feet of strip, or even a major part of an entire pass. In consequence, while the defect in the mill adjustment may become known for control of a subsequent pass, or perhaps a remainder of the pass under test, large quantities of strip of unsatisfactory contour may have been rolled and may have to be scrapped.

The longitudinal thickness variations are so designated because they are changes which are observable from place to place along the length of the strip (as it passes) and which are deemed to affect the thickness of the strip in the same way at all points or zones across it. In simplified terms of examples, these longitudinal thickness changes can be caused by changes in the vertical height of gap at the roll bite, while true profile changes can be caused by changes in roll contour, e.g., in regions of roll crown or concavity. Thus if a longitudinal thickness change occurs while a traversing gauge is measuring profile, the profile determination will be inaccurate unless suitable correction is made for the longitudinal variation.

Another available system for profile examination has involved a traversing X-ray gauge which has associated with it a stationary X-ray gauge at an adjacent position in the path of the delivered strip. The readings of these meters are connected for suitable combination of their signals, as in a difference circuit, whereby long term longitudinal gauge variations are cancelled out. It has been found, however, that rolling operations also commonly involve longitudinal gauge variations of a short term character, which in the rolling of aluminum may be typically of the order of 2 percent over a distance equal to one circumference of the back-up rolls (typically 15 feet) in a 4-high mill, and which can be responsible for faulty profile error signals greater than 0.2 percent. That is to say, even in the short distance of passage between the scanning meter and the stationary meter, there can be sufficient gauge variation to provide an erroneous profile measurement, approaching or equal to the above mentioned tolerance within which strip profile should be maintained.

It will be understood that changes in the profile configuration or shape are usually relatively slow, whereas these so-called longitudinal gauge variations may be quite rapid, affecting the entire width of the strip, without altering profile shape. Thus as indicated, the best equipment that is understood to be presently available fails to take into account these short term longitudinal variations in sufficient manner to avoid profile measurement errors of significant value, at least if it is desired to obtain rapid or essentially instantaneous readings as distinguished from readings which involve averaging of one sort or another over a protracted interval. Accordingly, there is need for methods and apparatus that will provide strip profile measurement in a prompt and effective manner, and more specifically, for such methods and/or apparatus of rugged, reliable and highly accurate character, representing improvement in these or other respects of convenience and simplicity over what has been available or may otherwise have been proposed heretofore.

SUMMARY OF THE INVENTION

To the foregoing and other ends and indeed to the underlying aim of affording improved profile measurement across a moving strip, the invention is generally predicated on the provision of methods and apparatus whereby the moving strip is scanned for thickness measurement crosswise thereof along a predetermined line transverse of the strip path while simultaneously a thickness measurement is effected at a selected point substantially on the line of scanning, with thickness measuring beams or the like which are mutually arranged to traverse the strip, as at an angle to each other, so that there is no mutual interference between the simultaneous thickness-sensing operations. Signals representative of the thickness values from the two operations are suitably combined, as by difference, to yield a scanned reading of the transverse thickness profile wherein longitudinal thickness variations are effectively cancelled out.

More specifically, it has been discovered that effective thickness readings and essentially simultaneous modification to eliminate, so to speak, thickness variations lengthwise of the strip, can be obtained by crossing beams of thickness-sensing function, e.g., beams traversing the strip at acute angles which extend in opposite directions relative to the path of the strip, so that one beam may be maintained at a single point in the path while the other scans across the path along a line passing said point, without the thickness-sensing function of either beam being interrupted or affected because of or by the other.

A particularly important aspect of the invention resides in the apparatus, which constitutes a profile gauge appropriate for fast-moving strip delivered from a rolling mill, wherein two pairs of supporting members are provided, the members of each pair being respectively disposed near opposite faces of the strip and being arranged so that a thickness-sensing beam, e.g., of X-rays or other penetrating radiation, traverses the strip from one member of the pair to beam-receiving means in the other member of the same pair. Each pair of members is advantageously arranged so that the members are in effect disposed in series along the strip path, e. g., one member upstream and the other member downstream of a desired line of scan perpendicular across the path, the members of the pairs being oppositely disposed in the latter respect so that considering the strip as between both pairs, each pair has one of its members directly above a member of the other pair. This mutually interfitting relation of the pairs of members permits both members of each to be disposed close to the scanning line and permits free movement of one pair relative to the other, while maintaining the above relation, during the desired scanning.

Cooperating with this arrangement the thickness-sensing means, including the beam generating and projecting device, is arranged in each pair so that the beam is projected obliquely from one member to the other, e.g., at an acute angle to the strip surface, and the projection paths of the beams are thus disposed at a substantial angle to each other. At least one of the pairs of members is arranged to be movable across the strip path, for thickness scanning, while the other is advantageously used at a fixed location, for example at the center of the strip path, and by virtue of the mutual crossing nature of the beams, there is no interruption or interference of sensing operation as the movable pair of members scans past the other pair.

A presently preferred and particularly advantageous arrangement of the apparatus embraces a structure joining the members of each pair at a locality outside the edge of the passing strip, so as to constitute the pairs as C-shaped structures respectively embracing the strip path, or a part of it, from opposite sides, thereby affording a very rigid, stable support for each thickness-measuring means whether used in one position or moved in scanning function across the path of the strip.

With operation of the sort described, it is found that a highly accurate determination of the transverse thickness profile can be achieved, essentially independent of even the short-term longitudinal variations of thickness that commonly occur in the rolling of strip. It may be explained at this point, that even though such longitudinal variations may be sufficiently small to keep the strip thickness within a fairly narrow gauge tolerance, i.e., ordinarily meeting gauge specifications for the product, the difficulties of improper profile are occasioned by thickness differences (crosswise of the sheet) which can well be within such limits of gauge tolerance. In other words even though the overall gauge variations may seem slight, circumstances may be such that their effect on profile determination, if not cancelled out, is objectionably serious.

Furthermore, as explained hereinbelow, correction of profile faults may in many cases be best achieved, or indeed only achieved, during hot rolling operations and thus well ahead of cold rolling procedure. Under such circumstances thickness or gauge may vary more than slightly during the rolling operation with which profile measurement is associated, either because highly precise gauge control is not ordinarily required at such stage or because it may be impossible to achieve under selected conditions of hot rolling. In any event, experience has indicated that over-all gauge variations, whatever their magnitude, are a likelihood in rolling operations, sufficient even in short lengths to affect the accuracy of profile sensing across a rapidly moving strip.

With the present procedure, and particularly utilizing the novel profile mesuring apparatus, it has been found possible to achieve very rapid, indeed essentially instantaneous and reliable determinations of thickness profile, which can be displayed on an oscilloscope or as a chart tracing or otherwise, or which indeed can constitute data or be translated into data appropriate for control of the mill through which the material is being processed. Particularly in that the longitudinal gauge variations, as measured by the stationary X-ray beam or the like, are found to be characteristic of the entire width of the strip, while the profile remains essentially unchanged over relatively long lengths of the material, the invention affords effective cancellation of the longitudinal thickness variations and yields a satisfactorily accurate representation of profile. The two preferably continuously produced measurements are at each instant effected on the same transverse region of the strip, i.e., at points which passed through the roll bite at the same time, it having now been discovered that essentially only in this manner can there be assurance of eliminating the effect of underlying, longitudinal, thickness changes which can occur sufficiently rapidly as to impair the accuracy of profile readings quite seriously even when it is attempted to make them at rather closely spaced localities, i.e., one beyond another, in the path of strip travel.

Thus the operator of the mill can be kept informed at frequent intervals, indeed essentially continuously if desired, regarding the character of departures of the product from desired profile, and he can take steps promptly, by appropriate adjustment of mill operation in suitable, known manner, to correct such errors, indeed in advance of their becoming so great as to impair the acceptability of the ultimate product.

A further, specific aspect of the invention involves procedure and apparatus whereby profile readings of the moving strip are converted to suitable control signals which are in turn employed for automatic control of the rolling mill itself, so that corrections of strip profile can be achieved as necessary and advantageously in such manner that actual departures from desired uniformity across the strip are minimized and kept within a suitable tolerance. In one effective embodiment, profile departures across the strip are employed for control of conventional coolant supply to the rolls of the hot mill, whereby roll contour is maintained for achieving desired uniformity of profile of the hot-rolled strip product.

Other significant features of the apparatus include means mounting both of the supporting structures to be moved transversely of the strip path, as by roller elements coacting with appropriate tracks beneath the path, preferably also with suitable driving means to advance the scanning structure so that its thickness-sensing device may traverse the entire width of the strip, with appropriate return drive. For initial set-up of a pass through the mill, the two structures can be moved entirely to opposite sides of the strip path, and then the stationary thickness-sensing members can be replaced in desired position, for example at the center line of the strip, and can be kept there throughout operation, while the other structure is moved across the strip to perform the scanning function.

BRIEF DESCRIPTION OF THE DRAWINGS

FIG. 1 is a simplified perspective view of one of the two coacting X-ray thickness measuring units or gauges embodying the invention (by way of example), this unit A being for continuous thickness response at a single longitudinal locality.

FIG. 2 is a like simplified view of the second unit or gauge, specifically unit B for traversing the moving strip to sense thickness at regions across the same.

FIG. 3 is a further, similar view showing units A and B in functional relationship to each other and a passing strip, the units being here illustrated as seen each from the opposite direction to the views of FIGS. 1 and 2.

FIG. 4 is a side elevational view of one representative unit, e.g., unit B as seen in FIG. 2, with certain further parts in phantom or diagram.

FIGS. 5 and 6 are opposite end views of a representative unit, for example unit B as seen respectively from the left-hand and right-hand ends of FIG. 4.

FIG. 7 is a simplified and diagrammatic view, in longitudinal elevation and in vertical section (as at the right-hand strip edge in FIG. 3), showing the passage of a strip through the coacting gauge units A and B from a rolling mill to the rewind coil.

FIG. 8 is a simplified diagram illustrating the conversion of signals from units A and B, by combination, for attainment of true profile measurement.

DETAILED DESCRIPTION

Figure 9:
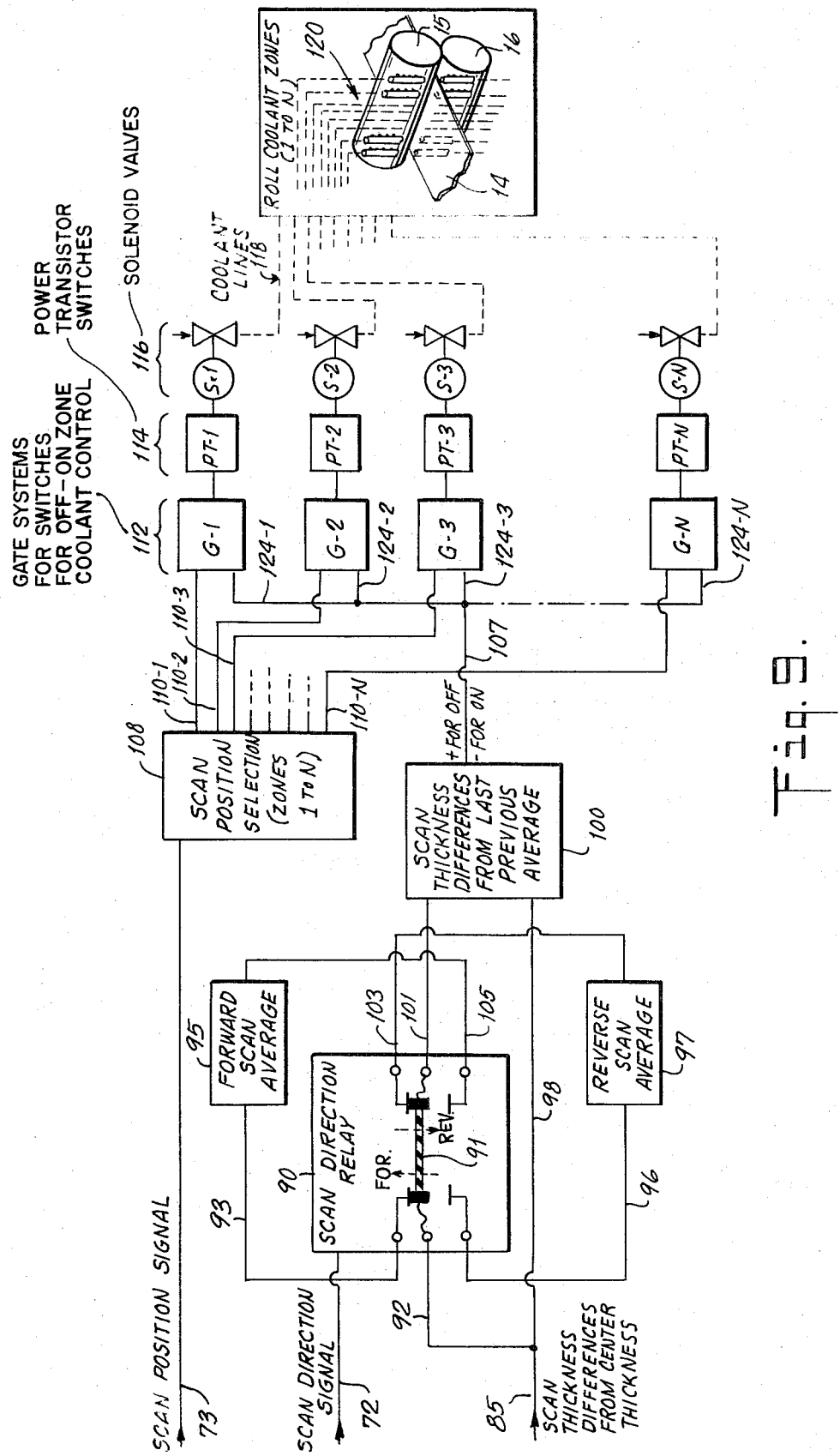
FIG. 9 is a schematic view of one example of a system for controlling mill roll configuration in response to strip profile determinations.

Referring first chiefly to FIGS. 1 to 7 of the drawings, the illustrated example of the apparatus involves two transversely movable X-ray gauge units A and B, which are basically embodied in a conventional C-frame structure for metal strip thickness measurement, but with an unusual alteration of such structure in accordance with the invention. The units are arranged to inspect (FIG. 7) a metal strip 14 delivered from the work rolls 15, 16 of a rolling mill stand and rewound under tension as a coil 17 on a suitably driven mandrel or core 18, the strip 14 being preferably kept level by passage over a guide roll 19. Although in a general sense the invention is conceived applicable to any mode of thickness measurement wherein a beam of penetrating radiation (whether X-ray, nuclear or other) is projected through the metal strip and is there modified in accordance with thickness, unusual advantages and convenience are attainable with X-ray gauging techniques, i.e., when employed as in the illustrated example of apparatus.

Unit A (FIGS. 1 and 3), which may be employed for detecting longitudinal thickness variations, comprises a lower frame arm 20 projecting horizontally from a vertical support structure 21, and an upper horizontal frame arm 22 carried by the support 21 parallel to the lower arm 20, but at a locality which is spaced not only vertically from the lower arm but also in a horizontal direction, i.e., longitudinally of the strip passage direction. This C-frame assembly including the staggered positioning of the substantially coextensive arms 20, 22 includes thickness measuring means arranged to project a sensitive beam, e.g., of X-rays, angularly through the strip passage region, between the ends of the arms as indicated at 23. Specifically, the beam generating and projecting means may be embodied in the outer end portion 24 of the lower arm 20, while the beam receiving and sensing means, such as a device responsive to magnitude or intensity of the beam, may be embodied in the enlarged head 25 of the upper arm 22. It will be understood that the strip 14 travels horizontally between the upper and lower arms (see FIG. 3) so that the thin X-ray beam 23 traverses the moving strip for attenuation of the received intensity of radiation by absorption, in accordance with strip thickness, as usual in X-ray gauging.

For movement of the unit crosswise of the strip path, there are a pair of forward rollers or wheels 26 beneath opposite sides of the outer end 24 of the arm 20, and a pair of rear rollers or wheels 27 beneath opposite sides of the vertical support 21. The wheels 27 are much more widely separated than the wheels 26, inasmuch as the support structure 21 is of approximately double width relative to the arms, for rigid interconnection of the latter in their staggered position. Thus, considered as a carriage, the unit is in effect relatively very wise at the rear region 21, with the consequent advantage of special stability and rigidity.

Preferably the forward wheels 26 are carried by a gimbal arrangement comprising a sub-frame 28 pivoted on a horizontal axle 29 that is supported from the outer end 24 of the arm 20, so that the truck consisting of the sub-frame 28 and the wheels 26 can rock about an axis that extends parallel to the arm and to the path of movement of the unit, i.e., crosswise of the strip. See also the further illustration of like means on unit B, described below. Hence, in effect the unit has a three-point support, being the two rear wheels 27 and the front wheel truck 28-26, to avoid twisting forces or other rocking or torsional stresses being transmitted to the C-frame.

The complemental unit B, shown in FIGS. 2 to 7 as contemplated for scanning entirely across the strip path, is exactly similar in construction to unit A, except that the lower and upper arms 30, 32 of unit B may be very substantially longer, i.e., in projecting from the vertical support or column 31, to accommodate the scanning operation, whereas unit A may only have to be moved from a position clear of the strip at one side, to a locality where the elements 24, 25 are near the center of the strip. With unit B, thickness is sensed by a thin X-ray beam 33 passing through the strip at an acute angle equal but opposite to the angle of the beam 23. Means for generating and projecting the beam 33 may be situated in the outer end portion 34 of the arm 30, and the beam is received and its intensity sensed by suitable means in the head 35 of the arm 32. The assembly is supported by rear wheels 37, below the column 31, and forward wheels 36 carried on a gimbal frame 38 rocking on an axle 39, all identical in structure and function to the similarly numbered parts 26 to 29 of unit A.

Although the vertical support and arms of each unit can be made of other beam or truss arrangements, the units are advantageously fabricated as box-like parts of heavy (e.g., one-half inch) steel plate pieces rigidly secured together (as by welding except where internal access may be needed), all in a manner similar to certain presently known C-frame X-ray gauges, this welded plate box construction being illustrated at arms 20 and 22 in FIG. 7. Internally the units, for use with hot rolling, may enclose suitable cooling means (not shown) for circulation of water or other coolant in appropriate portions of the horizontal arms and upright supports or columns, with flexible hose connections as may be required.

As indicated above, suitable X-ray beam projecting and receiving means are situated in the structure parts 24, 25 and 34, 35. Such means are well known in the art, as well as related instrumentation and circuitry, and details are therefore unnecessary here; indeed under known X-ray thickness gauging technology, reliable systems capable of measuring small, rapid variations are available, embracing means whereby the reduction in detected X-ray intensity due to absorption in the strip, in a generally exponential relation to thickness, is translated electronically to an electrical signal representative of actual thickness. Such instrumentalities, including devices producing highly intense, accurately aligned X-ray beams and sensitive detection devices, with low-noise reading and translating circuits, are applicable to the present invention wherein the beam is directed through the strip at an acute angle rather than perpendicularly, and corresponding specific description or illustration of such known technology is omitted, e.g., in FIGS. 8 and 9. For completeness, however, the angularly disposed X-ray tubes and detecting devices, the latter being embodied as photomultiplier tubes, are schematically indicated in FIG. 8, e.g., the X-ray generators 40 and 41 in elements 24 and 34 and detectors 42 and 43 in elements 25 and 35, correspondingly related to units A and B.

As shown in FIGS. 1-5, 7 and 8, the upper surface of the arms 20, 30, is conveniently beveled at 44, 45, in a plane perpendicular to the X-ray path 23 or 33, and an appropriate window 46 or 47 is mounted in the corresponding beveled surface, of conventional character transparent to X-rays, to allow passage of the related beam in usual manner, similar windows (not shown) being employed for beam ingress at the underside of the elements 25 and 35. As will also be understood, adjuncts conventional in X-ray gauging can be included if desired, such as remotely controllable magazine (not shown), in each of the structures 24, 34, of metal thickness standards insertable into the beam in position parallel to the strip path, for calibration of the system when strip is not present.

The Units A and B move crosswise of the path of the metal strip 14 on a plurality of rigidly supported, parallel rails, 50, 51 and 52. As shown, the widely spaced rear wheels 27, 27 and 37, 37 travel on the outer rails 50, 52, and likewise, respectively, the outside wheels of the forward pairs 26, 36. The inner wheels of the latter pairs ride on the central rail 51. Although other lateral guidance can be provided, the unit carriages also conveniently include guide rollers rotatable on vertical axes and disposed below the units so as to bear on vertical faces of the rails 50, 51 and 52. Thus, for example, as seen in FIGS. 4, 5 and 6 relative to unit B, a pair of such guide rollers 54 is associated with the gimbal frame 38 at the forward end of the arm 30, and a similar pair of such rollers 55, is associated with the column 31 at the locality of the rear wheels 37, identical guide rollers being similarly provided for unit A. Accurate tracking of the units is thus achieved without using flanges on the bearing wheels 26, 27, 36, 37, as might possibly allow the wheels to ride up or derail.

Each of the units is advantageously provided with power-driven means for displacing it along the rails, such means being particularly important for the scanning carriage, unit B, but being also desirable for unit A for convenience of moving the latter into and out of its central detecting position. Such mechanical drive, for each unit, can be of any suitable form, and for purposes of illustration is schematically shown with unit B in FIG. 4, as including a reversible drive motor 57 coupled to turn a sprocket wheel 58 that is arranged, as for example with cooperating guide sprockets 59, 60, to advance the carriage along a roller chain 62 which extends below the carriage, in a crosswise direction relative to the metal strip path. Thus the chain 62, fixed at its ends 63, 64 in suitable abutments, not shown, is guided between the wheels 59, 60 and over the drive wheel 58, for positive drive of the carriage in either selected direction. Electrical connections, including power lines for the motor and for the X-ray tube, control or like conductors, and likewise conductors for delivering the thickness signals, may extend into and from the unit in a large flexible cable 65 extending below the carriage to appropriate terminal means, not shown.

The critically significant feature of the illustrated units with their staggered and interfitting arm members, is that the respective thickness-sensing X-ray beams 23, 33 extend at an angle to each other as well as each at an acute angle to the vertical, or more particulary, that the beams in effect cross at a single line in the plane of the strip path, i.e., a line which extends perpendicularly across the strip 14, as best seen in FIGS. 3, 7 and 8. In this manner, simultaneous thickness sensing is attainable by both units, always with respect to two points in the rolled strip which had passed the roll bite together. In consequence as explained above, the effect of longitudinal thickness variations can be eliminated, yielding rapid and truly accurate profile measurements.

For such purpose, a preferred mode of operation is as follows: as or after the strip is initially moved past the locality of the units to be secured for winding on the reel 18, unit A is brought from a retracted position clear of the strip, very preferably to a locality as indicated in FIG. 3, where its X-ray beam 23 traverses a central point of the strip path, it being understood, however, that useful function of this beam can be achieved at some other fixed locality of the path. For each profile reading, e.g., after continuous delivery and coiling of the strip has begun, the other unit B, from a position entirely clear of the path at the other side, is advanced across the path so that its beam 33 scans entirely across the strip, from one side edge to the other, along a line which intersects the locality of the beam 23. In each such forward or reverse scan a continuous reading, or set of successive, closely spaced readings, can thus be obtained for the relative thickness values across the strip at positions longitudinally displaced because of the strip movement, while at the same time longitudinal variations in strip thickness are sensed continuously or at identically close intervals by the beam 23 of unit A. All of this is achieved without mechanical or other interference between the gauge carriages of the units or their sensing X-ray beams.

The apparatus preferably includes means signalling the successive positions of unit B as it scans across the metal strip and also means signalling the beginning and end of such scan, particularly in cooperation with means for reversing the drive so that if desired, the unit can automatically travel back and forth, in continuous or periodic succession of scanning operations. Inasmuch as means for generating signals of such functions may assume various forms, as of mechanical, electrical or optical nature, and indeed the scan reverse or scan direction signals may be readily obtained with limit switches or with devices photoelectrically actuated on passing the edges of the strip, specific details of such instrumentalities or devices of inherently conventional character are omitted, and FIG. 4 schematically shows, for simplified illustration, combined means 68 for all these purposes. Thus, for like simplicity of example, means 68 is shown as responsive to the position of the unit relative to the chain 62, through suitable means, including a line 69 from a device 70 controlled by a chain-connected element such as the idler wheel 60, suitably adjusted in terminal responses for actual position of edges of the strip 14 relative to the chain. Instrumentalities such as means 68 or other devices of appropriate structure and nature can consist of individually well known elements for these functions, and can thus provide scan-reverse signals, e.g., in a line 71, for controlling the motor 57 to drive the unit successively back and forth, and related scan direction signals in line 72 representing the direction, i.e., forward or reverse, in which the unit is about to move or is moving, and can also provide signals, as in line 73, which denote the position of the X-ray beam 33, e.g., its instantaneous distance from a selected strip edge regardlesss of direction of scan.

Referring to FIG. 8, the X-ray beam generators 40, 41 and the detecting devices 42, 43 in the units A and B respectively are suitably energized and controlled as is well known for X-ray gauging, the generators being supplied with an appropriately controlled voltage as indicated at 74. The thickness signals from the X-ray gauges, specifically from the detecting means 42, 43, are interfaced or otherwise directed to appropriate amplifying and translating means 75 and 76 respectively. The means 75, being responsive to the signals of the scanning unit B, establish a varying signal or series of signals which represent changing thickness but necessarily include thickness variations occurring both crosswise of the strip and lengthwise thereof, the longitudinal variations, being thus characterized by change with time, being here desired to be eliminated. The signals developed through the means 76, from the stationary thickness sensing unit A, represent longitudinal profile changes only, i.e., changes occurring with time and thus corresponding to that part of the readings of device 75 which is occasioned by such longitudinal variations.

Thus conveniently signals from devices 75 and 76 are supplied to a suitable difference circuit 78 whereby in effect the longitudinal or solely time-varying signals are subtracted from the total, time— and width—varying profile signals and thus afford in the correspondingly controlled device 80 an indication or other registration or read-out of the true transverse profile, with the longitudinal or time variations eliminated or balanced out as has been explained above.

Simplified graphic presentation of one instance of these relationships is shown in the plots at the right-hand side of FIG. 8, wherein the thickness readings, greatly exaggerated, are represented by the vertical axis and the factors of width (i.e., crosswise position) and/or time are represented by the horizontal axis. Thus the profile curve 81 represents the type of profile reading which could be obtained from the means 75, wherein each point across the curve has a value affected not only by transverse thickness differences but also by longitudinal variations.

The curve 82 is intended to represent changes of longitudinal thickness during the time of scan, i.e., the thickness changes which occur, at the selected point, with the longitudinal travel of the strip during the scanning time. Finally, the curve 83 shows the true transverse profile as determined by the means 80, translating the operation of the circuit 78 and thus eliminating the longitudinal variations by mathematically appropriate subtraction. Hence the plot 80 shows the true crosswise contour, for example as related to a suitable base line 84, which may represent the actual thickness of the strip at the center and may now be considered as a straight line, i.e., unaffected by longitudinal variations. Hence one convenient type of output signal, as at 85, from the means 80 for readout in an X-Y chart recorder, oscilloscope or the like may be the scanned thickness differences (positive, negative or zero), across the strip, from the thickness of the strip at its center.

It may be explained that although the curves 81, 82 and 83 are drawn as if from a single instance, they nevertheless illustrate the kind of response that is obtainable with the described procedure and apparatus; most particularly, the curves show that if as may often occur, there is a significant longitudinal variation (curve 82) this can so affect the simple scanning determination (curve 81) as to distort it very undesirably from the true profile reading, such as in curve 83. It may also be noted that in actual readings with instrumentation of the sort contemplated, the mechanically or electronically plotted curves may not be perfectly smooth (as here shown for simplicity) but may be characterized by minute vertical variations of instrumental or other origin. Nevertheless the results are basically of the nature here illustrated, demonstrating the important function of the invention in providing essentially instantaneous, highly accurate profile readings.

It is conveniently sufficient that the profile be signalled or plotted as thickness departures from a straight line, as if the strip had one truly plane surface, and likewise simply as relative differences in thickness from point to point across the strip, although the instrumentation may, if desired, yield actual thickness values, e.g., as vertical cross-section dimensions taken at a single transverse line perpendicular to the strip edges. Information derived from relative variations, e.g., as in plot 83 of FIG. 8, is ordinarily adequate for purposes of mill control or adjustment to achieve desired profile flatness tolerance in the rolled strip.

In practical embodiments of the apparatus, dimensional relationships can be as required for accommodating the desired strip path and for providing high rigidity and stability of the sensing units. The angular direction of each X-ray beam is correlated with the structure of the units, and as indicated, the employment of the angularly crossing beams permits close juxtaposition of the units for reading on substantially the same transverse line, while affording room for units of ample size to achieve the above mentioned rigidity and stability. A presently preferred angle for each of the beams 23 and 33 is 24°, measured from the vertical or normal to the passing strip surface. To a considerable extent, the larger this angle, the greater the likelihood of unwanted error in the resulting readings due to casual or incidental movements of the units, e.g., rocking, vibration, or other unavoidable displacement. For practical purposes, it is presently believed that angles up to about 45° might still permit some utility of result with apparatus of the nature shown. Conceivably with appropriate design of the equipment smaller angles, say down to 15°, may be employed, but the selected angle of 24° or thereabouts is now thought to represent a feasible optimum.

By way of specific example of the procedure, a typical use involves rapidly repeated profile-measuring scans back and forth across aluminum strip 60 inches wide and one-eighth inch thick emerging from the final stand of a tandem hot mill, i.e., the rolls 15, 16 of such stand (FIG. 7), at a speed of 1,000 feet per minute, such hot mill strip being coiled or wound at 17 under suitable tension. A useful scanning speed for the unit B across the strip may be 10 feet per minute, representing a single scan interval, in one direction for the 60 inch strip, of about 30 seconds. As will be appreciated, much slower scanning speeds can be employed if desired, or conceivably faster speeds if electronic instrumentalities are appropriately designed for handling such signals. In the illustrated example, each scan can be recorded on a pen-type, X-Y recorder chart, or alternatively presented on an oscilloscope that is preferably accompanied by memory means for subsequent readback if desired.

In one instance of design of units A and B, each of the upright or supporting sections 21 or 31 may have a horizontal dimension in the direction of strip travel, e.g., between wheels 27 or 37, of about 30 inches, and a height such that with the arms of each unit dimensioned proportionally in the general manner shown, the vertical gap between the parts 24, 25 or 34, 35 is about 14 inches. For the unit A, intended to sense the thickness along the center of the strip, the arms may project so that the distance or throat dimension between the strip-adjacent vertical wall of the upright 21 and the X-ray beam 23 is about 60 inches; the corresponding distance in the scanning unit B may be about 85 inches. The equipment as described or as suitably modified to suit the requirements of a given mill and size of rolled strip, can be applied to profile measurement on a large variety of such materials, e.g., aluminum, steel, brass and various other metals, which may for example range in strip width from 20 inches to 90 inches and strip thickness from 0.030 inch to 0.250 inch. The procedure is appropriate for any of a large range of strip speeds, e.g., from 100 to 3,000 feet per minute, its suitability in that respect being a special advantage in contrast to previous modes of profile measurement.

As indicated above, the invention, although usefully applicable for profile determination of any travelling sheet material (including measurement on cold rolled sheet strip for inspection purposes) is of special utility in the examination of hot rolled strip as directly delivered by a hot mill, whether at the end of hot rolling or even at an intermediate stage in a series of hot rolled passes. As explained above, strip profile errors which most commonly arise and are most troublesome in hot rolling or as a result thereof, are difficult to correct in subsequent cold rolling; indeed it is generally recognized, under rolling theory, that the profile of strip which has been hot rolled and is supplied to a cold mill should not be expected to be capable of significant change in shape in a cold rolling operation.

As also explained above, profile errors of the hot rolled strip have been found to represent a cause of off-flatness or other shape deterioration in an ultimate, rewound, cold rolled sheet product. Particularly in the situation of large coils of such product as attained in modern rolling mills utilizing high rolling speeds, the final strip flatness, as distinguished from profile considered alone, is found to be badly affected by profile errors. This loss of flatness is understood to be due largely to local concentration of rewind stresses in the coil, notably when the thick regions of successive turns are drawn tightly against each other. Indeed it can be shown mathematically, taking the rewind tension and the values of yield strength and Young's modulus for the metal, that relatively small errors of thickness, i.e., in profile, can result in distortion of the corresponding thick regions of the strip on coiling, especially where the excessive thickness is in a relatively small proportion of the strip width. Thus in the case of a number of common aluminum alloys, and where the rewind tension may be only 10 percent of the yield strength, there will be localized stretch, and distortion such as waviness or the like when the strip is later uncoiled, if there are one or more thick longitudinal bands (often at the edges, or sometimes elsewhere) totaling less than 10 percent of the cross-sectional area.

The problem is more pronounced in softer alloys, having low yield strength, but rewind tension may have to be quite large in other cases, e.g., steel, thereby increasing the possibility of flatness. Moreover, the stress concentration and resulting elongation tend to increase from the inside diameter of the coil to the outside, and serious defects of shape, due to uneven stretch, may arise even when theoretically unlikely. In consequence of all the foregoing it is extremely important to determine and control the profile of the material during hot rolling, especially so as to avoid serious profile errors that in effect survive cold rolling.

As also indicated above, the actual thicknesses across the width are not the primary matter of concern, but the question is one of relative differences. Indeed troublesome thickness variations across the strip may ordinarily be smaller (by an order of magnitude — factor of 1/10) than the longitudinal thickness variations, e.g., even than the longitudinal variations which are within normal gauge tolerance for hot rolled products. These circumstances emphasize the importance of simultaneously sensing both types of thickness variation throughout each profile-measuring scan, in the manner afforded by the invention.

Imporatnt uses of rapid and frequent profile readings on the strip delivered by the hot mill are not only to ascertain the suitability of the strip for cold rolling, but most particularly to enable the operator to adjust the mill for avoidance or correction of undesired profile, indeed at times when the departure from intended contour is still insufficient to affect the ultimate product. Suitable corrective measures may involve change of collant to the rolls of the mill at selected zones across each roll, or modification of bending forces on the rolls by change of force in suitable bending jacks, or adjustment of screwdown forces as to affect roll bending generally or for example to correct unbalance, or other shape-controlling alteration of the operation of handling and rolling the strip. In many cases, the procedure of making corrective adjustments is effectively performed in a manual fashion, as by the attention to and manipulation of necessary controls by the operator in response to observation of the displayed profile plots or measurements.

It is also a feature of the invention to utilize the signals from the profile measuring equipment to effectuate automatic control of the rolling mill, e.g., involving adjustment of one or more means related to the shape or contour of the rolled strip, in such fashion as to maintain substantially uniform profile of desired character, across the strip. As an example, one effective mode of automatic control especially where rapid changes in roll gap shape due to rolling load variations may be inconsequential or may be corrected by other means, can involve adjustment of the coolant liquid to the rolls of the mill, e.g., as may be delivered at a multiplicity of zones across each roll, by spray or streams from suitably positioned outlets, in known manner. With such control of the coolant, which may be water, oil, or other liquid especially suited for the purpose, the temperature of each roll is altered in localized fashion, and correspondingly the local shape or diameter of the roll, such thermal adjustment being well known for correcting roll contour errors, whether occurring thermally or even by some wear, and for correspondingly determining the profile of the metal being rolled.

Although any of a variety of known electronic or similar systems can be utilized for translating thickness signals, e.g., from the output circuit 85 of the profile-determining means 80 of FIG. 8, into roll zone cooling changes, FIG. 9 schematically shows, for example, one suitable control system for this purpose. This system provides individual control of coolant flow at a multiplicity of zones of the rolls, e.g., including operations of opening a valve in each coolant flow line or leaving such valve open, when a decrease of thickness appears at the particular corresponding zone of the strip, or shutting off the flow or keeping it closed, when the thickness increases at the particular zone. To the extent that other or additional roll contour or pass gap contour adjustments are preferable or indicated in a particular case, it will be understood that appropriate means may be utilized or added as necessary under like control of the profile signals.

The system of FIG. 9 is thus specifically designed to receive the true profile signals derived from successive forward and reverse scanning operations of unit B and the continuous readings of unit A and to convert these signals into control of valves in the coolant lines to the respective zones of the mill. Although other means can be employed for such conversion, a convenient arrangement is to compare each series of thickness readings, of a given scan, with an average taken from the readings for the previous scan, thereby determining changes from the latter, whereupon the roll coolant flow is controlled in response to such changes. Assuming that the mill has been initially adjusted or is specially adjusted early in the run to deliver strip of proper profile, this system is effective and sensitive to small changes, in a manner sufficient to maintain proper profile by correcting profile errors before they reach sufficient magnitude to affect the delivered strip adversely.

In particular, the illustrated system receives the following signals: (a) profile signals as in the output circuit or line 85 of FIG. 8, representing values, during scan across the strip, of differences of thickness (which may be positive, zero or negative) from the thickness at the center or other point selected for measuring longitudinal variations; (b) scan position signals, as in line 73 from FIG. 4, which may, for example, be a voltage or like quantity representing in value, the instantaneous distance from one selected edge of the strip in the direction toward the other; and (c) a signal, as derived in line 72 of FIG. 4, representing the direction of scan, being significantly effective at the beginning of each scan, or at the change of scan direction.

The scan direction signals in line 72 control a corresponding two-position relay 90 whereby when or as a forward scan is initiated the relay contact assembly 91 is raised so that profile signals from the line 85 are routed by branch line 92 and line 93 to an average-determining and memory unit 95 of suitable character which responds to the lowest and highest values of the thickness signals and temporarily stores the thus computed high-low average as representing an average thickness signal for the forward scan. When or as the scanning unit reverses direction as represented by a new signal in line 72, the relay 90 drops its assembly 91 and a circuit consisting of the lines 92 and 96 directs the thickness signals of the reverse scan (from line 85) to another average-determining and memory unit 97, identical with the unit 95 and functioning to compute the average of the highest and lowest thickness readings and temporarily store such high-low average of the reverse scan in an appropriate memory circuit.

During each scan, thickness signals at 85 are also directed via line 98 to a computing converting unit 100, which also receives from a line 101 the stored reading of the average thickness value from the immediately preceding scan. Specifically, when the direction relay 90 has its contacts 91 in the upper position for the forward scan and the unit 95 is determining the average value for the forward scan and the forward scan profile signals are being delivered to the converting unit 100, the unit 100 is simultaneously connected through lines 101 and 103 to receive the stored average thickness value of the previous, reverse scan unit 97. When the relay contact assembly 91 is in its lower position, i.e., during the immediately following, reverse scan, the unit 100 (which continues to receive profile signals, now of the reverse scan, in line 98) is connected to receive the stored average thickness of the previous, forward scan through lines 101 and 105. Hence the unit 100 has an input which consists of the thickness difference signals during the occuring scan whether forward or reverse, and simultaneously the temporarily stored average thickness signal from the immediately preceding scan, i.e., reverse or forward. It will be understood that each of the elements 95 and 97 includes appropriate reset provision, for example under suitable control of the relay element 90, whereby the temporarily stored average signal is in effect erased just before the beginning of the next scan in which that element must compute an average.

The unit 100 includes suitable electronic instrumentalities for comparing the received thickness difference readings with the computed average from the preceding scan, and for delivering, in its output circuit 107, successive signals, which may be of digital nature if desired, that represent departure (if any) of each instantaneous zone-localized signal from such preceding average value. The delivered signal may conveniently be one which is positive for increase of thickness or negative for decrease of thickness, or zero for no change in thickness, e.g., no change exceeding a suitable threshold. Simultaneously the scan position signal received in the line 73 is delivered to a position selection instrumentality 108, which has a set of outputs 110-1, 110-2, 110-3 to and including 110-N, equal in number (N) to the roll coolant zones of the controlled mill, as for example twenty such zones. The function of the device 108 is to convert the position values to discrete zone indicia and thus to provide a control or triggering signal, successively in the output lines 110-1 to 110-N, in accordance with the position of the scanning device (unit B) crosswise of the strip, this being an absolute positional selection, regardless of the direction of the scan.

The system also includes a corresponding number of electronic gate systems generally designated 112 and identified as G-1, G-2, G-3 to G-N inclusive, which are respectively controlled by the output lines 110-1 to 110-N of the position selection unit 108, and which respectively control a like series of switches, as for example suitable power transistor switches designated 114 and individually identified as PT-1, PT-2, PT-3 through PT-N. The latter switches correspondingly control a series of solenoid valves 116, being valves S-1, S-2, S-3 through S-N in the coolant flow lines generally designated 118 to the roll coolant zones schematically shown at 120 relative to the rolls 15, 16 of the controlled mill, there being a total number N of such lines and of such zones. As will be apparent, the converted profile signals from the device 100 (representing departures from the previous scan) are also supplied to the gate systems 112, for the line 107 through a manifold circuit consisting of lines 124-1, 124-2, 124-3 through 124-N, to the units G-1, G-2, G-3 through G-N.

It will now be understood that the gate systems 112 and the switches 114 are appropriately designed, with suitable electronic circuits, so that a given solenoid valve 116 is only subjected to a control signal if the corresponding gate system simultaneously receives a triggering signal from the scan position selector 108 and a positive or negative signal from the thickness signal converter 100. More particularly, although the converted thickness signals are continuously available to all the gate systems, the latter can only function, i.e., in succession, when the corresponding triggering signals are received from the selector 108 through the appropriate lines 110-1 to 110-N.

Thus as the given scan (for example a forward scan) progresses, at each zone a triggering signal is delivered to the corresponding gate system of such zone while such gate system is then in fact receiving the converted thickness signal (from unit 108) appropriate to such zone. If the thickness signal is positive, the corresponding power transistor switch 114 is actuated, relative to the associated solenoid valve 116, e.g., to open the valve if the latter has been closed or to leave the valve open if it has been open. On the other hand, if at the time a given gate system receives its triggering signal from the selector 108, the converted thickness signal is negative, the corresponding transistor switch 114 then closes the related solenoid valve 116 or keeps it closed if it has been previously set in closed position. Should the converted signal from the device 100 be a zero signal, there is no effect on the corresponding gate system when the related position signal is received and there is no change in the related transistor switch or solenoid valve, the latter simply remaining in its previously set position, whether closed or open.

The described system of FIG. 9 affords an essentially continuous control of roll coolant flow at the several zones of the mill, depending on the profile readings in each successive scan, in a manner appropriate to prevent profile errors from growing to a significant value.

Coolant flow is turned on or off or left unchanged in effect in accordance with the instructions of the profile reading in each scan, conveniently compared with the average of the immediately preceding scan, so that the shape of the roll is maintained, by thermal control of local expansion and contraction, in a suitable manner to correct departures of profile from desired condition and in effect to maintain the desired overall characteristics of strip profile. As will be understood, the electronic instrumentalities employed in the several devices schematically indicated as units in FIG. 9, e.g., for performing the various described functions, may be of conventional nature; suitable means and circuits for such individual operations are indeed well known and therefore require no detail description here.

Although the system is manifestly capable of further refinement in any manner that circumstances may require, it is presently conceived that the described conversion of signals and control of coolant valves is adequate for maintaining roll shape in many cases. For instance, while the scan averaging can with suitable, complex electronic circuits be determined from a reading of all zones or positions in a given forward or reverse scan, simplicity of circuitry is achieved with provision for a high-low average alone, and such is deemed to be adequate under usual circumstances as where substantial changes in profile occur at no more than a slow or moderate rate.

For convenience, the system is illustrated as controlling coolant flow to a single roll stand, which may indeed be sufficient; alternatively the coolant flow can be simultaneously controlled to the rolls of all stands of a tandem mill. Likewise the coolant-controlled stand or stands may involve various roll arrangements whether of the simple two-roll form shown or of four-high character. Of course, the profile signals can be employed for other types of corrective control, such as work roll bending means, or in very wide mills, backup roll bending means, in substitution for or in supplement to the described coolant control. It will be understood that all installations of the invention for automatic control may preferably also include means providing visual indication or record of the measured profile, as contemplated in FIG. 8, whereby the operator may take additional corrective steps, even replacement of badly worn rolls, if need for same becomes evident.

The invention is in all of these ways well suited to attain its objects, especially for determining the transverse profile of travelling metal strip in a rapid and immediately useful manner, with good accuracy and without significant error caused by longitudinal thickness variations that may occur during a profile-measuring scan.

It is to be understood that the invention is not limited to the specific instrumentalities and operations herein set forth by way of illustration but may be carried out in other ways without departure from its spirit.

We claim:

1. A method of measuring the thickness profile across a lengthwise-moving metal strip, comprising:
   a. scanning the strip along a line transverse of the direction of movement, with a first thickness-sensitive beam, to provide signals representing thickness values at the succesively scanned strip localities;
   b. simultaneously throughout said scanning step measuring the thickness of the moving strip at a selected stationary point, substantially within said line of scanning, with a second thickness-sensitive beam to provide signals representing variations in thickness of the strip at said point during the scanning step;
   c. said beams being mutually disposed and arranged so that as the first beam scans past said selected point each beam is transmitted through the strip and received, for thickness-measuring operation, without interference with the thickness-measuring operation of the other beam at said point; the aforesaid disposition of the beams including respectively directing them along paths at sufficient, oppositely extending angles to the perpendicular to the strip surface, to prevent interference of said thickness-measuring operations; and
   d. combining the signals that result from the first and second beams to provide a transverse profile determination which is substantially unaffected by longitudinal strip thickness variations as represented by thickness variation signals from the selected point.

2. A method as defined in claim 1 in which each of said angles is at least about 15°.

3. A method as defined in claim 2 in which each of said angles is about 24°.

4. A method as defined in claim 1 wherein: beam-generating beam-sensing
   e. said first and second beams are transmitted through the strip between corresponding pairs of eam-generating and beam-sensing elements respectively near opposite faces of the strip,
   f. the elements of the pairs being oppositely staggered in position lengthwise of the strip, and said beams being correspondingly transmitted at oppositely inclined acute angles to the strip,
   g. said scanning step including moving said pair of elements for the first beam past the said pair of elements for the second beam.

5. A method as defined in claim 1, in combination with producing said moving strip by rolling operation which is adjustable for altering the profile of the produced strip, said strip being in movement lengthwise from said rolling operation, which includes
   h. detecting departure of the transverse profile of the aforesaid determination from a desired profile, and
   i. adjusting the rolling operation in accordance with said detected departure to correct the profile of further production of said strip.

6. In a method of measuring the thickness profile across a length-wise moving metal strip, the steps comprising:
   a. scanning the strip along a line perpendicular to the direction of movement, with a first X-ray beam which traverses the strip at an acute angle to the surface thereof and which is received after said transversal, to provide signals representing thickness values at the successively scanned strip localities; and
   b. simultaneously throughout said scanning step directing to the strip, at a selected point substantially within said line of scanning, a second X-ray beam which traverses the strip at an acute angle to the surface thereof and which is received after said traversal, to provide signals representing variations in thickness of the strip at said point during the scanning step;

c. the aforesaid traversal angles of the beams being mutually disposed to provide a sufficient angle between beams as the first scans past the second at said point to prevent interference between said thickness-sensing operations with the beams.

7. A method as defined in claim 6 in which each of the beams is directed to the strip at an angle between about 15° and about 45° to the perpendicular to the strip surface, and the angle between the beams is at least about 30°.

8. A method as defined in claim 6, which includes combining the signals from the first and second steps by diminishing the thickness values of the first step signals in accordance with thickness values of simultaneous second step signals for cancelling the thickness variations at said point from the transverse measurements to provide a determination of transverse thickness profile of the strip which is substantially independent of longitudinal thickness variations.

9. A method as defined in claim 8, in which each of the beams is directed to the strip at an angle between about 15° and about 30° to the perpendicular to the strip surface, and the angle between the beams is at least about 30°.

10. A method as defined in claim 9 wherein
  d. each of said X-ray traversing and signal-providing steps is effected by projecting the corresponding X-ray beam from a first element near one face of the strip and receiving and sensing such beam at a second element near the opposite face of the strip,
  e. said elements for the first beam being separated longitudinally of the strip on selected opposite sides of said scanning line, said scanning operation being effected by moving said elements for the first beam together across the path of the strip, and
  f. said elements for the second beam being separated longitudinally of the strip on opposite sides of the scanning line which are respectively different from the aforesaid selected sides, whereby said second beam elements are disposed clear the scanning movement of the first beam elements.

11. A method as defined in claim 8, in combination with producing said moving strip by rolling operation which is adjustable for altering the profile of the produced strip, said moving strip being in its aforesaid longitudinal movement as delivered under tension from said rolling operation, which includes
  g. making successive determinations of transverse thickness profile along a continuous strip by the aforesaid steps,
  h. detecting unwanted thickness values in such profile in said successive determinations, and
  i. adjusting the rolling operation in accordance with said detected values for correctively altering the profile of further delivered strip.

12. A method as defined in claim 11 which includes
  j. delivering each of the transverse profile determinations as a series of thickness-measuring signals at localities across the strip,
  k. said detecting of unwanted profile values comprising converting said last-mentioned signals into corresponding signals compared with an average thickness characteristic of the preceding profile determination of the strip, to represent departures from said average thickness, and
  l. said adjusting the rolling operations comprising effecting corrective strip-thickness-altering adjustment at localities across the rolls of the rolling operation in accordance with said last-mentioned thickness-departure signals.

13. A method as defined in claim 12 in which
  m. the rolling operation involves controlling the shape of the rolls by delivering coolant thereto at localities across the rolls,
  n. said corrective strip-thickness-altering adjustment comprising controlling flow of said coolant selectively at said localities for correcting unwanted thickness values of the delivered strip profile.

14. Apparatus for measuring the thickness profile across a metal strip moving lengthwise along a defined path, comprising:
  a. a first thickness-measuring means including means for directing a thickness-sensitive beam through said path at an angle to the plane of a strip therein, movable to scan such strip with said beam along a line across the path of the strip; and
  b. a second thickness-measuring means including means for directing a second thickness-sensitive beam through said path at an angle to the plane of the strip at a selected point substantially on said line;
  c. said beam-directing means being mutually arranged to direct their respective beams at an angle to each other for permitting said first thickness-measuring means in its scanning movement to pass said second thickness-measuring means at said point without interference of thickness-measuring functions of said first and second measuring means; said beam-directing means being arranged to direct their beams at acute angles, to the perpendicular to the plane of the strip, which respectively extend in opposite directions of the strip path relative to said line.

15. Apparatus as defined in claim 14, which includes means controlled by said first and second measuring means and including means for mutually modifying the measurements of both said measuring means during scanning movement of the first measuring means, for producing a measurement of the transverse thickness profile of the strip which is unaffected by thickness changes at said point during said scanning movement.

16. Apparatus as defined in claim 15 which includes output means controlled by said last mentioned measurement-producing means, for converting departures of said measured profile, from desirable profile, into signals representing such departures at successive localities across the strip.

17. Apparatus as defined in claim 16, in combination with adjustable rolling means for producing said strip and means directing the strip in movement from the rolling means longitudinally past the thickness-measuring means, comprising means controlled by said output means and in response to said signals, for adjusting the rolling means to correct departures of produced strip from desired profile.

18. Apparatus as defined in claim 14, in which each of the beam-directing means is arranged to direct its beam at such acute angle of about 15° to about 45°.

19. Apparatus as defined in claim 14, in which each of the first and second measuring means comprises beam-receiving means and C-shaped supporting structure, said C-shaped structures being respectively complementary to each other and embracing the path from regions at respectively opposite edges thereof, each structure carrying the related beam-directing means and beam-receiving means at opposing ends of its C shape, adjacent to respectively opposite faces of a strip in the strip path.

20. Apparatus as defined in claim 19, which includes means for moving the supporting structure of the first measuring means crosswise of the path to effect scanning of the strip with the first beam along said line.

21. Apparatus as defined in claim 20, which includes means controlled by said first and second measuring means and in response to thickness signals derived therefrom during travel of the first measuring means across the path, and including means modifying the signals from the first measuring means by the signals from the second measuring means, for producing a measurement of the thickness profile across the strip.

22. Apparatus as defined in claim 21 which includes output means controlled by said last mentioned measurement-producing means, for converting departures of said measured profile, from desired flatness, into a series of signals representative of the existence and extent of such departures at successive localities across the strip.

23. Apparatus as defined in claim 21, which is arranged for repeated operations, including repeated scanning movements of said first measuring means and resulting thickness profile measurements produced by the profile-measurement-producing means, and which includes output means controlled by said profile-measurement-producing means and including measurement-storing means, for converting departures of a selected thickness profile measurement from desired profile as represented by an average thickness determined from a preceding profile measurement, into signals representing such departures at successive localities across the strip.

24. Apparatus as defined in claim 23, for use in cooperation with adjustable rolling means whereby said strip is delivered in movement past the first and second thickness-measuring means, comprising means adapted to control such rolling means for adjustment thereof to alter the profile of the strip delivered from rolling, said rolling adjustment control means being arranged under control of said output means, for effecting corrective adjustment in the profile of delivered strip.

25. Apparatus as defined in claim 21, in combination with rolling means for producing said strip and means directing the strip in movement from the rolling means longitudinally past the first and second thickness-measuring means, comprising means controlled by said profile-measurement-producing means for adjusting the rolling means to correct departures of produced strip from desired flatness of profile.

26. Apparatus for measuring the thickness profile across a metal strip moving lengthwise along a defined path, comprising:
   a. two thickness-measuring means each including means directing a thickness-sensitive beam through said path at an angle to the plane of a strip therein;
   b. one of said measuring means being arranged for movement to scan the strip path with its beam, along a line across the strip, and the other measuring means being arranged for directing its beam at a selected point on said line;
   c. said angular beam paths of the respective directing means being disposed at a sufficient angle to each other to permit said moving measuring means to pass said selected point without interference of thickness-measuring functions of said two measuring means; each beam being directed at an angle of at least about 15° to the perpendicular to the strip plane; and
   d. means controlled by said two measuring means and in reponse to signals derived therefrom during scanning of the moving means across the strip path, and including means modifying the signals from the moving measuring means by the signals from the other measuring means, for producing a measurement of the thickness profile across the strip.

27. Apparatus as defined in claim 26, in which each measuring means comprises X-ray means facing one surface of the strip for generating and directing the angular beam of X-rays and means facing the opposite surface of the strip for receiving the angular X-ray beam to produce signals responsive to thickness of the strip.

28. Apparatus as defined in claim 27, in which each beam is directed at an angle of about 24° to the perpendicular to the strip plane.

29. Apparatus as defined in claim 27, in which each of the two measuring means comprises
   e. C-shaped supporting structure for crosswise embracing the strip path from opposite edges thereof, having two arms near respectively opposite faces of said path, the X-ray means and receiving means of said measuring means being respectively disposed in the arms of the corresponding C-shaped structure,
   f. the arms of the structure for the scanning measuring means being disposed in longitudinal separation along the strip path at selected opposite sides of the scanning line, and
   g. the arms of the structure for the other measuring means being disposed in longitudinal separation along the strip path at opposite sides of said line which are respectively different from the aforesaid selected sides, whereby said other measuring means and its said structure can be disposed to be clear of the scanning movement of the scanning measuring means and its said structure.

30. Apparatus as defined in claim 29, in which each of the C-shaped structures includes for moving it along a predetermined track across the strip path, whereby the scanning measuring means can be moved from one position clear of the path, in scanning displacements back and forth across the path, and whereby the other measuring means can be moved from an opposite position clear of the path to a position for measuring function at said point at a central region of the path.

31. Apparatus as defined in cliam 26, in which each measuring means comprises X-ray means facing one surface of the strip for generating and directing the angular beam of -rays and means facing the opposite surfase of the strip for receiving the angular X-ray beam to produce signals responsive to thickness of the strip, and in which said signal modifying means comprises a difference circuit wherein thickness values ofthe scanned siggnals are reduced by thickness values of the signals from the selected point, to yield signals representing thickness profile values across the strip corresponding to constant thickness at said point.

32. Apparatus for measuring the thickness profile across a metal strip moving lengthwise along a defined path, comprising two pairs of supporting member, the members of each pair being respectively disposed near opposite faces of a strip in said path and in regions adjacent to opposite sides of a line that perpendicularly cross the path, in the plane of such strip, said pairs of members being disposed in mutual complementary relation across said path, one of said pairs of members being movable crosswise of the path and the aforesaid dispositions of the supporting members being mutually arranged to permit the members of the movable pair to move through regions unoccupied by the members of the other pair, thickness-measuring means associated with each of said pairs of members, each thickness-measuring means including means projecting a thickness-sensitive beam between the two members of the pair across said line in a path at an acute angle to the surface of the strip, said angles of the beam paths extending oppositely to each other relative to the path of the strip, whereby the thickness-measuring means carried by the movable members may scan the width of the strip without interference with thickness-measuring operation of the means associated with the other pair of members.

33. Apparatus as defined in claim 32, which includes means controlled by the respective measuring means of said pairs of members and in response to thickness signals derived therefrom during travel of the movable pair of members across the width of a strip in the defined path, and including means modifying the signals from the movable pair by the signals from the other pair, for producing a measurement of the thickness profile across the moving strip.

34. Apparatus as defined in claim 32, in which the pairs of members are respectively provided with mutual supporting elements extending between the upper and lower members of the pairs at regions outside opposite edges of the strip path, to constitute each of the pairs of members as a rigid C-shaped structure with the members respectively extending crosswise of the strip path near opposite faces thereof.

* * * * *

UNITED STATES PATENT OFFICE
CERTIFICATE OF CORRECTION

Patent No. 3,766,386　　　　　　　　Dated　October 16, 1973

Inventor(s) Olivo G. Sivilotti et al.　　Page 1 of 2

It is certified that error appears in the above-identified patent and that said Letters Patent are hereby corrected as shown below:

Column 7, line 15, "wise" should read -- wide --.

Column 15, line 57, after "taneous" and before "zone-localized" insert -- or --.

Column 18, line 26 (Claim 4), "clain" should read -- claim --.

Column 18, lines 26 and 27 (Claim 4), after "wherein:" delete "beam-generating beam-sensing".

Column 18, line 30 (Claim 4), "eam-generating" should read -- beam-generating --.

Column 18, line 58 (Claim 6), "transversal" should read -- traversal --.

Column 20, line 48 (Claim 16), "desirable" should read -- desired --.

UNITED STATES PATENT OFFICE
CERTIFICATE OF CORRECTION

Patent No. 3,766,386                    Dated October 16, 1973

Inventor(s)  Olivo G. Sivilotti et al          Page 2 of 2

It is certified that error appears in the above-identified patent and that said Letters Patent are hereby corrected as shown below:

Column 22, line 57 (Claim 31), "-rays" should read -- X-rays --.

Column 22, line 58 (Claim 31), "fase" should read -- face --.

Column 22, line 62 (Claim 31), "siggnals" should read -- signals --.

Column 22, line 68 (Claim 32), "member" should read -- members --.

Column 23, line 4 (Claim 32), "cross" should read -- crosses --.

Signed and Sealed this

Seventh Day of June 1977

[SEAL]

Attest:

RUTH C. MASON
Attesting Officer

C. MARSHALL DANN
Commissioner of Patents and Trademarks